Nov. 7, 1950 C. H. KAUFMAN 2,529,025
LAWN RAKE
Filed Aug. 12, 1948 2 Sheets-Sheet 1
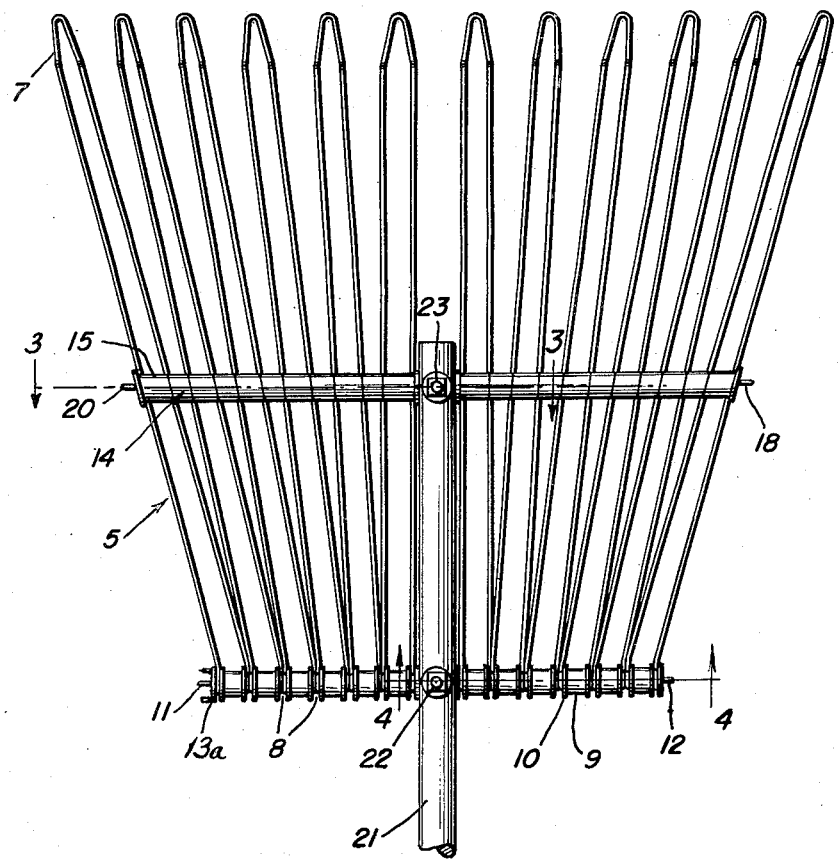
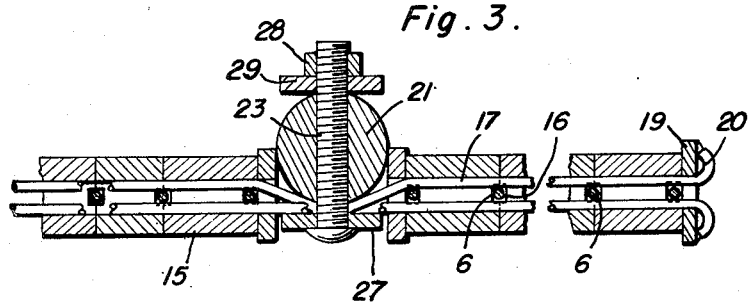
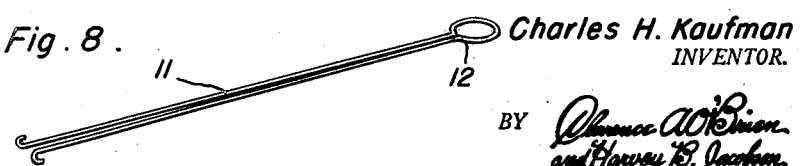
Charles H. Kaufman
INVENTOR.

Nov. 7, 1950 — C. H. KAUFMAN — 2,529,025
LAWN RAKE
Filed Aug. 12, 1948 — 2 Sheets-Sheet 2
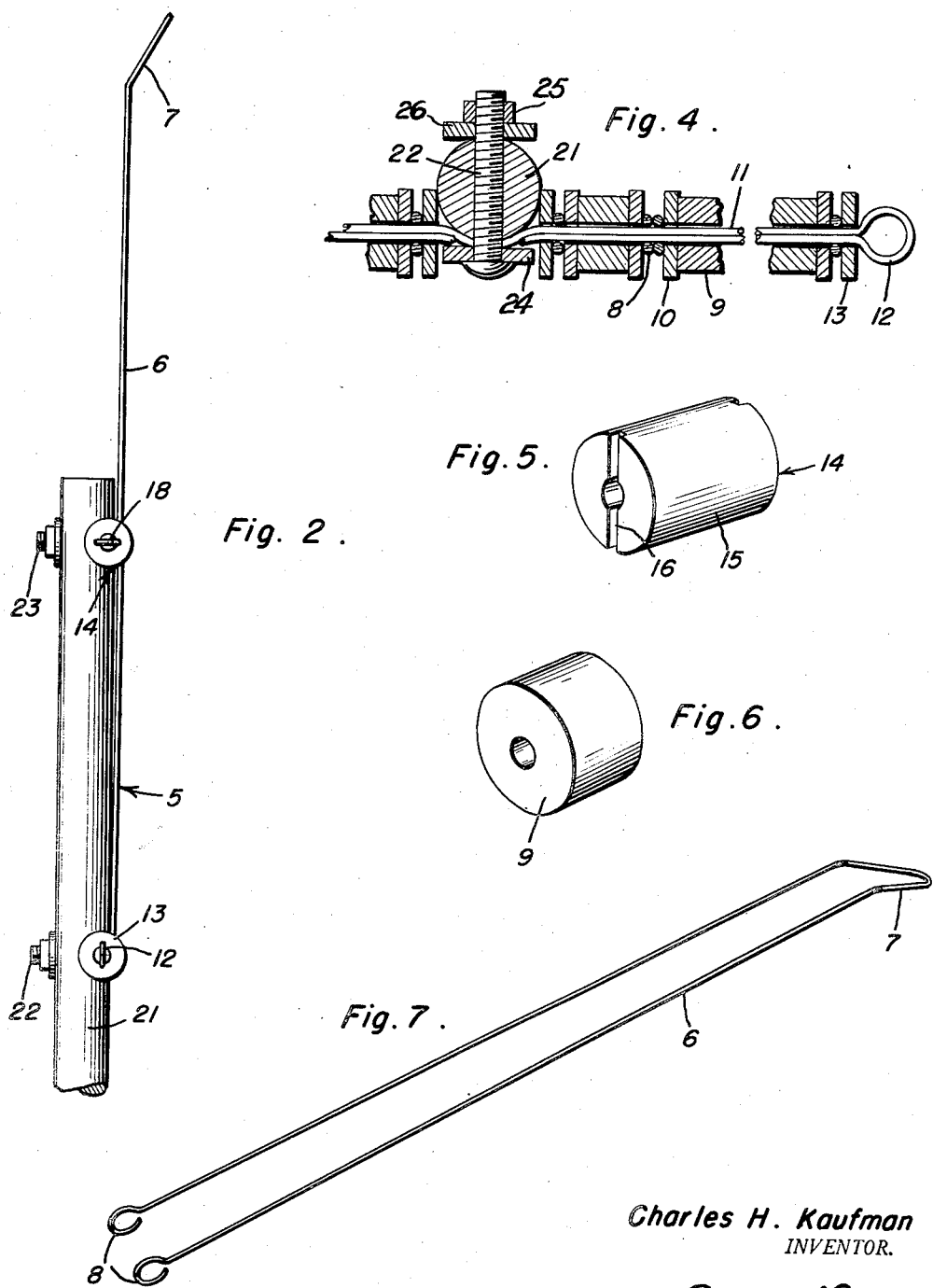
Charles H. Kaufman
INVENTOR.

Patented Nov. 7, 1950

2,529,025

UNITED STATES PATENT OFFICE 2,529,025

LAWN RAKE

Charles H. Kaufman, San Antonio, Tex.

Application August 12, 1948, Serial No. 43,885

4 Claims. (Cl. 56—400.17)

The present invention relates to new and useful improvements in lawn rakes of the broom type embodying the provision of a plurality of resilient tines projecting substantially longitudinally from the outer end of a handle to provide a light-weight rake construction.

An important object of the invention is to provide novel attaching means for the inner ends of the tines and a novel bracing construction for the intermediate portion of the tines.

A further object of the invention is to provide simple and practical means for attaching the group of tines as a unit to the outer end of a rake handle.

A still further object is to provide a device of this character of simple and practical construction, which is strong and durable, neat and attractive in appearance, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a top plan view of the rake head;

Figure 2 is an enlarged side elevational view;

Figure 3 is an enlarged fragmentary sectional view taken substantially on a line 3—3 of Figure 1;

Figure 4 is a similar view taken on a line 4—4 of Figure 1;

Figure 5 is an enlarged perspective view of one of the spacers forming a brace for the intermediate portion of the tines;

Figure 6 is a similar view of one of the spacers for the inner ends of the tines;

Figure 7 is an enlarged perspective view of one of the tines; and

Figure 8 is a perspective view of one of the tie wires for the tines.

Referring now to the drawings in detail wherein for the purpose of illustration I have disclosed a preferred embodiment of the invention, the numeral 5 designates the rake head generally which is composed of a plurality of tines 6, each tine being formed of a spring steel rod bent upon itself in substantially U-form. The outer ends of the tines are inclined laterally as shown at 7 in the usual manner and the inner ends of the tines 6 are formed with loops or eyes 8.

The sides or legs of each tine are held in a spread apart relation by means of spacing collars or sleeves 9 and washers 10 at each end of the collars or sleeves. A tie wire 11 is bent upon itself and inserted through the spacing collars 9, washers 10, and through the eyes 8 to connect the inner ends of the tines in assembled relation, the eyes 8 being positioned between adjacent pairs of the washers 10, as shown more clearly in Figure 4 of the drawings. The bent end of the tie wire 11 is formed with a loop 12 and with a washer 13 positioned between the endmost eye 8 and the loop and with the ends of the tie wire 11 clinched or bent against a washer 13a at the opposite side of the rake to hold the eyes 8, collars 9 and washers 10 in assembled relation on the tie wire.

The intermediate portion of the tines 6 are provided with a brace member designated generally at 14 and which comprises a plurality of spacing collars or spreaders 15 positioned between the sides or legs of each tine and also between each tine, the ends of the spacing collars or spreaders 15 having transverse grooves 16 therein. The spacing collars or spreaders 15 and an intermediate portion of the tine are held in assembled relation by means of a tie wire 17 bent upon itself and passed through the collars 15, one end of the tie wire 17 also being formed with a loop 18 and the ends of the tie wire being bent against a washer 19 as shown at 20.

The inner ends of the tines and the brace 14 are secured to a handle 21 by means of inner and outer bolts 22 and 23 inserted transversely through the handle 21 and between the respective tie wires 11 and 17. A washer 24 is positioned between the head of the bolt 22 and the tie wire 11 and a nut 25 is threaded on the end of the bolt 22 at the opposite side of the handle against a washer 26. Likewise, a washer 27 is positioned between the head of bolt 23 and tie wire 17 and a nut 28 is threaded on the other end of bolt 23 against a washer 29.

From the foregoing it will be apparent that the inner ends of the tines 6 are assembled on the tie wire 11 with spacing collars 9 therebetween and the spacing collars 15 and intermediate portion of the tines are also assembled on the bracing tie wires 17 to form the head 5 of the rake which may then be assembled as a unit on the handle by means of the bolts 22 and 23.

In view of the foregoing description taken in conjunction with the accompanying drawings, it is believed that a clear understanding of the device will be quite apparent to those skilled in this art. A more detailed description is accordingly deemed unnecessary.

It is to be understood, however, that even though there is herein shown and described a preferred embodiment of the invention, the same is susceptible to certain changes fully comprehended by the spirit of the invention as herein described and the scope of the appended claims.

Having described the invention, what is claimed as new is:

1. A lawn rake comprising a rake head composed of a plurality of substantially U-shaped resilient wire tines, eyes at the inner ends of the tines, and connecting means for the inner ends and for the intermediate portions of the tines and including spacing members between the legs of the tines, wire tie members formed of united double strands of wire extending through the spacing members and holding the tines and spacing members in assembled relation, a handle, and handle attaching means connecting the tie members to the handle and including a fastener extending through the handle and between the double strands of each wire tie and clamping said strands to the handle.

2. A lawn rake comprising a rake head composed of a plurality of substantially U-shaped resilient wire tines, eyes at the inner ends of the tines, and connecting means for the inner ends and for the intermediate portions of the tines and including cylindrical spreaders between the legs of the tines, wire tie members formed of united double strands of wire extending through the spreaders and holding the tines and spreaders in assembled relation, a handle, and handle attaching means connecting the tie members to the handle and including a fastener extending through the handle and between the double strands of each wire tie and clamping said strands to the handle.

3. A lawn rake head comprising a plurality of substantially U-shaped resilient wire tines, eyes at the inner ends of the tines, a transversely extending tie member inserted through the eyes, spacing sleeves on said tie member between the eyes, and a brace for the intermediate portion of the tines and comprising spacing sleeves between adjacent legs of the tines and positioned in abutting end to end relation with respect to each other, said last named spacing sleeves having grooves in their ends in which the tines are seated, and a tie member inserted through said last-named spacing sleeves.

4. A lawn rake head comprising a plurality of substantially U-shaped resilient wire tines, eyes at the inner ends of the tines, a transversely extending tie member inserted through the eyes, spacing sleeves on said tie member between the eyes, and a brace for the intermediate portion of the tines and comprising spacing sleeves between adjacent legs of the tines and positioned in abutting end to end relation with respect to each other, said last named spacing sleeves having grooves in their ends in which the tines are seated, a tie member inserted through said last-named spacing sleeves, a handle, and handle attaching bolts connecting said tie members to the handle.

CHARLES H. KAUFMAN.

REFERENCES CITED

The following references are of record in the file of this patent:

UNITED STATES PATENTS

| Number | Name | Date |
|---|---|---|
| Re. 2,156 | Pratt | Jan. 23, 1866 |
| 837,140 | Smyth | Nov. 27, 1906 |
| 846,586 | Lepeley | Mar. 12, 1907 |
| 1,592,764 | Hamilton et al. | July 13, 1926 |
| 2,294,157 | Brooke | Aug. 25, 1942 |
| 2,300,729 | Kemmer | Nov. 3, 1942 |
| 2,304,171 | Hess | Dec. 8, 1942 |
| 2,355,840 | Alles et al. | Aug. 15, 1944 |